United States Patent
Rhee

(10) Patent No.: US 6,758,532 B2
(45) Date of Patent: Jul. 6, 2004

(54) AUTOMOBILE SPIDER WHEEL HAVING A STAINLESS STEEL FACE LAYER AND A PROCESS FOR MANUFACTURING THE WHEEL

(76) Inventor: So Young Rhee, Millenniumcetel Room No. 506, 876-9, Bongcheon-dong, Gwanak-gu, Seoul (KR)

( * ) Notice: Subject to any disclaimer, the term of this patent is extended or adjusted under 35 U.S.C. 154(b) by 0 days.

(21) Appl. No.: 10/211,904

(22) Filed: Aug. 2, 2002

(65) Prior Publication Data

US 2004/0061374 A1 Apr. 1, 2004

(51) Int. Cl.[7] .............................................. B60B 7/06
(52) U.S. Cl. .............................. 301/37.43; 301/37.102; 301/65; 29/894.34; 164/111
(58) Field of Search ........................ 301/37.101, 37.102, 301/37.43, 63.101, 63.106, 64.101, 64.102, 64.301, 64.5, 64.702, 64.704, 65; 29/894.34, 894.344; 164/111, 112

(56) References Cited

U.S. PATENT DOCUMENTS

| | | | | |
|---|---|---|---|---|
| 2,091,602 A | * | 8/1937 | Le Jeune | |
| 3,968,996 A | * | 7/1976 | Wilcox | 301/37.43 |
| 4,530,542 A | * | 7/1985 | Spiegel et al. | 301/37.101 |
| 5,368,370 A | * | 11/1994 | Beam | 301/37.43 X |
| 5,595,423 A | * | 1/1997 | Heck et al. | 301/37.43 |
| 5,855,700 A | * | 1/1999 | Guerard | 164/111 X |
| 6,109,334 A | * | 8/2000 | Phipps | 164/112 X |

* cited by examiner

*Primary Examiner*—Russell D. Stormer
(74) *Attorney, Agent, or Firm*—Flynn, Thiel, Boutell & Tanis, P.C.

(57) ABSTRACT

An automobile spider wheel is made of aluminum alloys and has an outer face layer made of stainless steel. A process for manufacturing the automobile spider wheel includes working the stainless steel insert by a known press process based on side face shapes of an automobile wheel. Joining faces of the insert are treated roughly by sanding or brushing for joining with melted aluminum alloys. Protrusions are fixed on the joining faces of the insert in positions corresponding to rim support faces of the insert. The stainless steel insert is inserted in surface-to-surface relationship with a surface of a lower mold of a molding device with the protrusions projecting upwardly. The stainless steel insert is integrally molded-to the melted alloys to form the wheel by a known die casting process after closing the molding device. The automobile spider wheel of Al alloys with a viewable face layer of the stainless steel plate insert has a pleasing appearance without any of the aluminum plating showing in the external appearance of the wheel and the wheel faces are easy to clean.

13 Claims, 6 Drawing Sheets

AUTOMOBILE SPIDER WHEEL HAVING A STAINLESS STEEL FACE LAYER AND A PROCESS FOR MANUFACTURING THE WHEEL

FIELD OF THE INVENTION

The present invention relates to an automobile spider type wheel made of aluminum alloys and having a face layer of stainless steel. The face layer is formed on one side of a stainless steel insert which is worked by a press process. When the spider wheel is cast by a die casting process the casting material is integrally molded on the faces on the other side of the spider wheel whereby the external appearance of the resulting spider wheel is made beautiful and easy to clean.

In addition, the present invention relates to a process for manufacturing the automobile spider wheel. Automobile wheels include disc type wheels as well as spider wheels. The present invention may be applied to a disc wheel as well as the spider wheel of the invention.

BACKGROUND OF THE INVENTION

In general, a spider wheel for automobiles comprises a rim which supports a tire and a hub. The hub is formed with a hub axle hole which receives the axle and a number of hub nut holes which fix the wheel to the axle. A number of rim supports are radially formed between the hub and a rim base.

In order to facilitate reduction of weight in the wheel and cooling during the production of heat by a brake drum, the spider wheel formed holes between the rim supports have mainly been used.

The automobile spider wheels with tires must allot and support the entire weight of the automobile and must bear up against torques during driving and braking, impulse forces on the road, centripetal forces in rotation and forces in the side direction produced in slanting or turning the automobile. The spider wheels must have light weight and reduce the retention of heat.

Accordingly, materials for conventional automobile wheels have aluminum alloys as casting alloys. The aluminum alloys used include A356 alloys which comprise Al as a main component and can include Mg, Si, Sr, Ti and Fe as minor components, AM alloys and SAM alloys having Mg and Si in different amounts.

Conventional automobile wheels which use the aluminum alloys have been made by a die casting process, which is simple and possible for mass production, or by a combined process which combines the die casting process with a spinning process to provide high strength and high toughness.

However, the automobile wheels made of aluminum alloys which are cast by the die casting process have faces with an external appearance that does not look attractive. In addition, when faces of the wheels have adhered thereto contaminants, such as fine soils, dust, oils and the like, there is much difficulty in washing the contaminants.

Further, in a modified wheel for automobiles, the wheel has been worked to have a smooth face and then has been plated with cromium. The wheel with Cr plating looks fine in external appearance on the face thereof, and is easily washed. However, when the wheel with Cr plating is manufactured, a surface working process or a plating process is supplemented and manufacturing costs such as working cost, making cost and labor cost are highly increased, and many process hours are required to manufacture the wheel. Accordingly, in mass production for the wheels there are various technical problems and cost problems.

SUMMARY OF THE INVENTION

An object of the present invention is to provide an automobile spider wheel of aluminum alloys with a face layer formed as a stainless steel insert to overcome drawbacks of the prior art.

Another object of the present invention is to provide an automobile spider wheel made of an aluminum alloy or alloys, and having a face layer of a stainless steel material at least on the viewable portion of the wheel. A stainless steel insert is worked by a press process based on side face shapes of an automobile wheel to provide wrapped faces for a rim, and faces for a hub and rim supports with holes formed between the rim supports of the automobile wheel. The faces provide the external appearance of the wheel when a tire is mounted thereto and the wheel is secured to a vehicle. On an opposing side of the stainless steel insert, the faces for joining with a melted aluminum alloy are treated roughly by sanding or brushing. A plurality of supporting protrusions are weldably fixed on the joining surfaces of the insert in positions corresponding to rim support faces of the wheel. The insert is placed on a bottom of a lower mold of a molding device with the protrusions projecting upwardly. The side face of the insert having the joining surface is integrally molded to the wheel formed of at least one aluminum alloy by a die casting process after assembling left and right molds and an upper mold of the molding device. The protrusions are then embedded in the aluminum alloy. The faces of the insert contacting the lower mold remains as stainless steel.

Further, an object of the present invention is to provide an automobile spider wheel of aluminum alloy with a face layer of stainless steel so that smoothness, brightness, easy cleaning and beautiful external appearance on the viewable faces of the wheel are provided without any plating treatment due to the stainless steel insert properties having high brightness, corrosion resistance and heat resistance.

Embodiments for the spider wheel and a process for manufacturing the wheel will be explained according to the drawings in greater detail.

DETAILED DESCRIPTION

Figure 1:
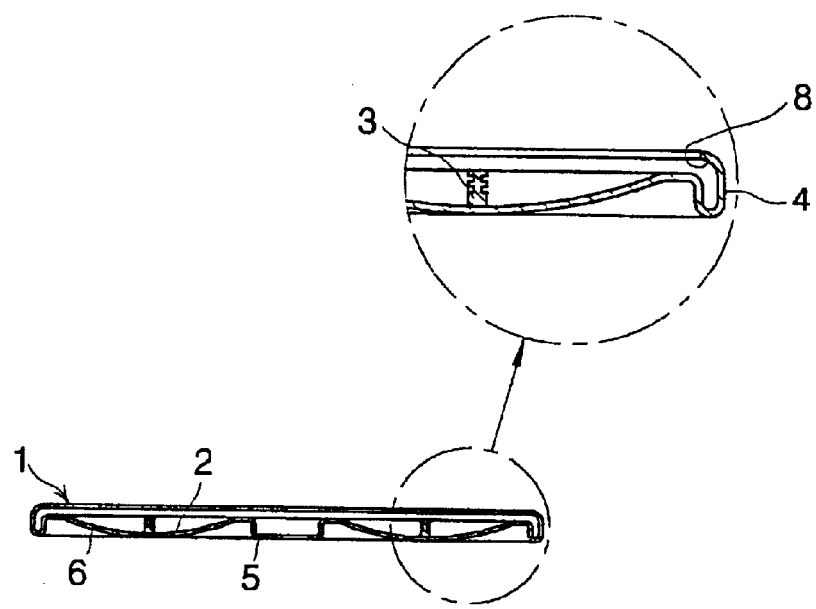
FIG. 1 is a vertical section of a stainless steel insert according to one embodiment of the present invention.
Figure 2:
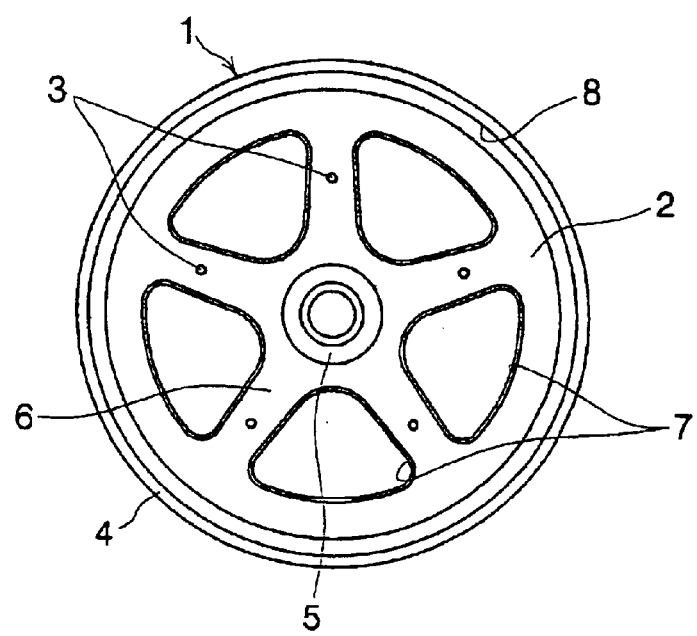
FIG. 2 is a plan view of FIG. 1.

FIGS. 1 and 2 illustrate a stainless steel face plate or shaped stainless steel insert 1. When a wheel is positioned in a tire (not shown) and then is placed on a hub axle of the wheel, only stainless steel faces of the insert 1 are viewable. The stainless steel insert 1 is worked by a press process to form a rim surface 4, a hub face 5, a rim support face 6 and hole faces 7, respectively as parts providing an external appearance having faces on the lateral face of the finished wheel.

The stainless steel insert 1 preferably comprises a 18-8 stainless steel (SUS 304) including Cr 18% and Ni 8% (Austenite steel). The stainless steel insert preferably has a thickness in a range of from 0.5 mm to 0.7 mm.

Figure 3:
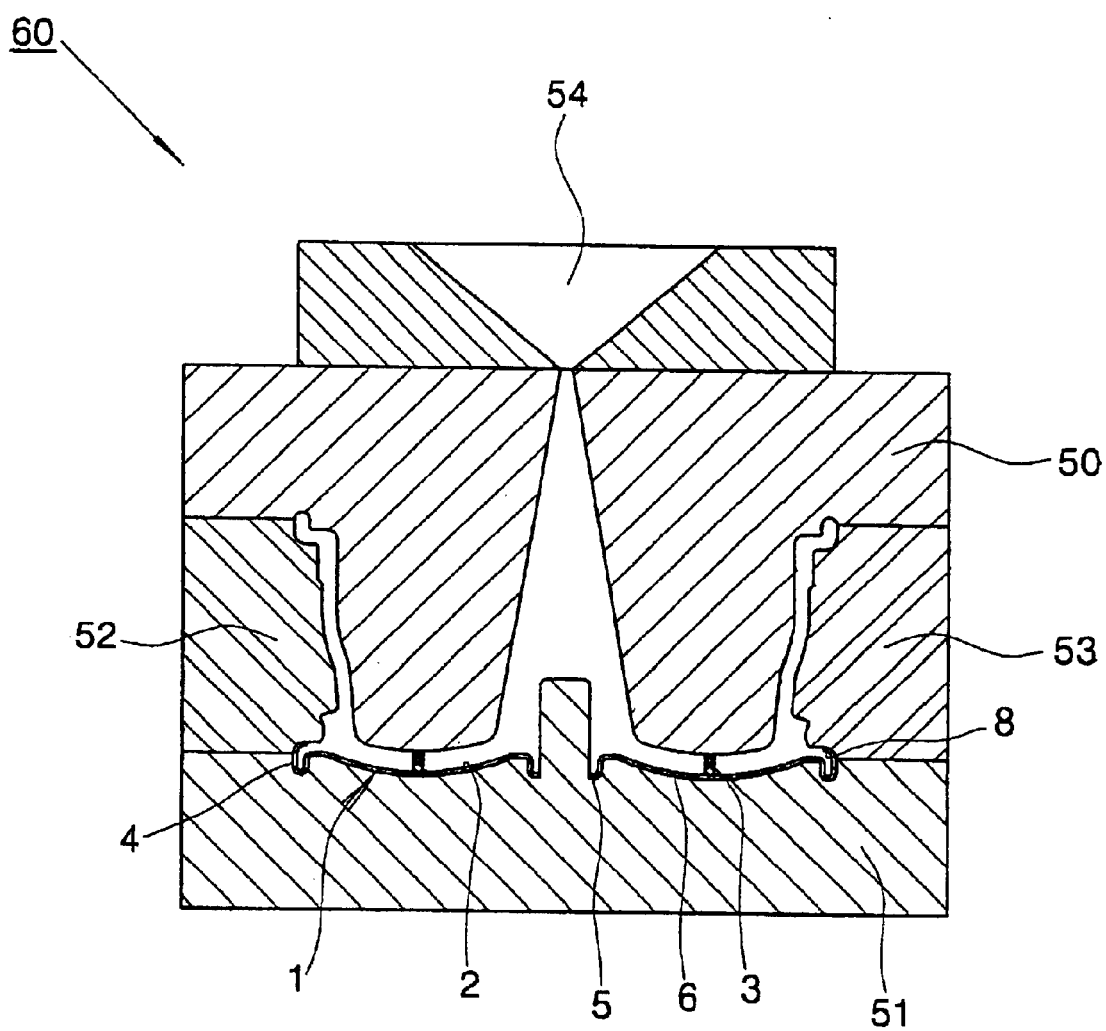
FIG. 3 is a sectional view of a molding device for manufacturing the wheel according to the present invention.

A joining face 2 of the stainless steel insert 1, i.e. a top face of the insert 1 in FIGS. 1 and 2 is on an opposing side of the insert from the rim support surface 6 as shown in FIG. 3. The joining face 2 is roughly treated by sanding or brushing. The joining face 2 is located on an opposing side of the insert 1 than the rim support face 6 of the wheel. The joining face 2 is weldably fixed with a number of supporting protrusions 3 having undercuts which can be defined as concave-convex regions.

FIG. 3 is a schematic sectional view of a molding device for manufacturing the wheel according to the present invention. The molding device 60 shown in FIG. 3 includes a top mold 50, a lower mold 51, and left and right molds 52 and 53.

The top mold 50 is operated to move upwardly and downwardly by the known die casting machine (not shown). The lower mold 51 is fixed, and the left and right molds 52 and 53 are operated to move left and right, and in forward and backward directions, respectively.

Figure 6:
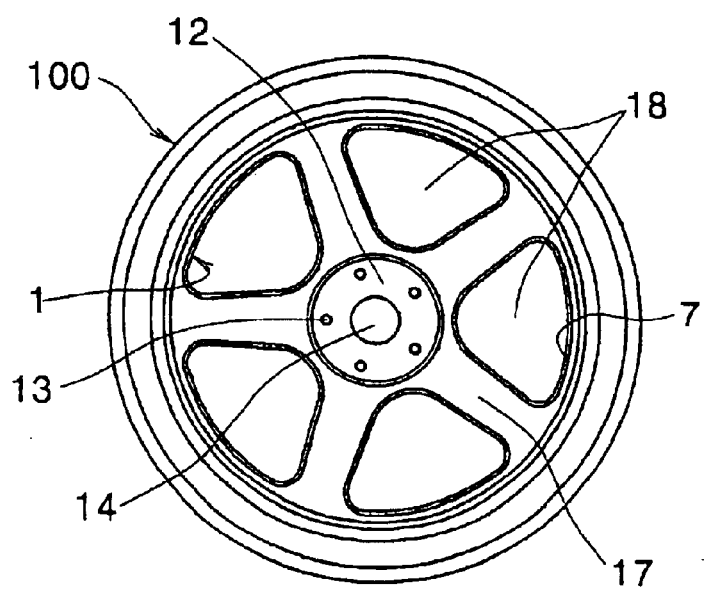
FIG. 6 is a left side view of FIG. 5.
Figure 7:
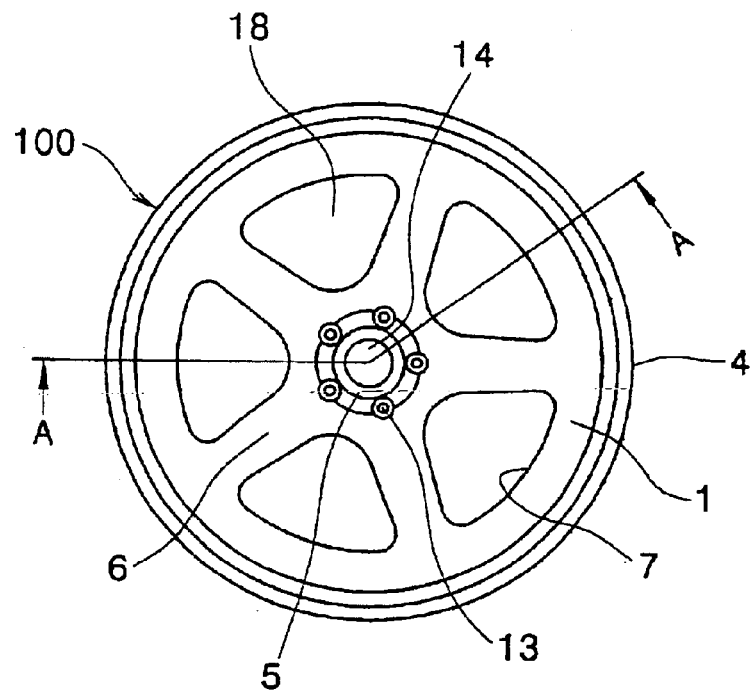
FIG. 7 is a right side view of FIG. 5.
Figure 8:
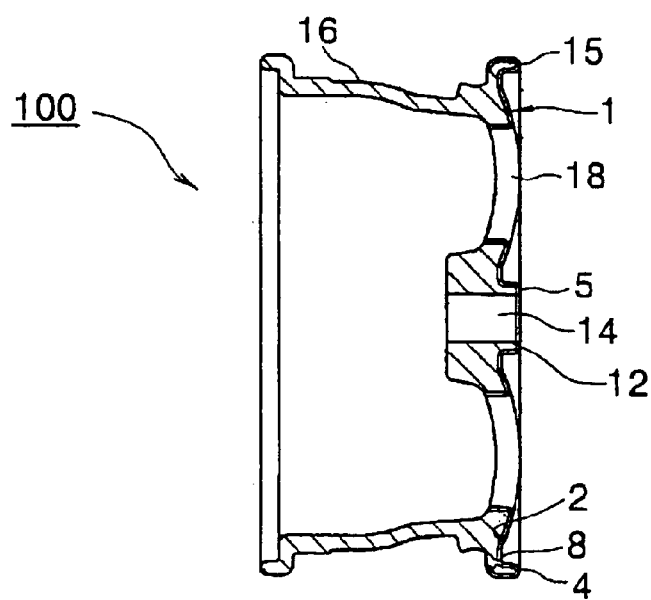
FIG. 8 is a vertical section taken on line A—A of FIG. 7.

In addition, the molding device 60 is formed with shapes for the wheel 100 (see FIG. 6) and operated by a conventional die casting process. The insert 1 is shaped to match the surface of the fixed lower mold 51.

The stainless steel insert 1 is integrally molded on the joining face 2 to one or more Al alloys by the molding device 60 to form the wheel 100.

The conditions for integrally molding the insert to the Al alloy will be described below in greater detail.

First, on the stainless steel insert 1, a number of supporting protrusions 3 are formed protecting upwardly. The protrusions 3 include undercuts as shown in FIG. 1. The insert 1 is positioned on the top surface of the lower mold 51 with the projections on a side of the insert 1 opposite from a surface of the lower mold 51. The viewable faces of the insert 1 are in surface-to-surface contact with the mold surface of the lower mold 51. Then the molds 52 and 53 and the top mold 50 are assembled closing the mold.

After assembling the molds, one or more melted Al alloys are poured through melt inlet 54, and then casting under low pressure is carried out by the conventional die casting process.

When the casting is carried out, the stainless steel insert 1, inserted on the lower mold 51, is pressed by the molds 52 and 53 at an end portion of a bending part 8 of the rim face 4, and the melted Al alloy does not flow between the bottom of the mold 51 and the stainless steel insert 1. Since the joining face 2 of the stainless steel insert 1 is roughly treated by sanding or brushing, the securement of the melted Al alloy to the stainless steel insert 1 preferably is improved.

The protrusions 3 on the joining face 2 are imbedded in the melted Al alloy and are fixedly joined or welded to the insert 1. The undercuts of the protrusions 3 ensure securement of the steel insert 1 to the hardened alloy. Further, the bent part 8 of the insert 1 receives the melted Al alloy and provides a securing function because of the overlapping edge of the rim.

Accordingly, the stainless steel insert 1 is integrally molded on the lateral face of the wheel 100 to prevent removal of the stainless steel insert 1 from the lateral face of the finished wheel 100.

Figure 4:
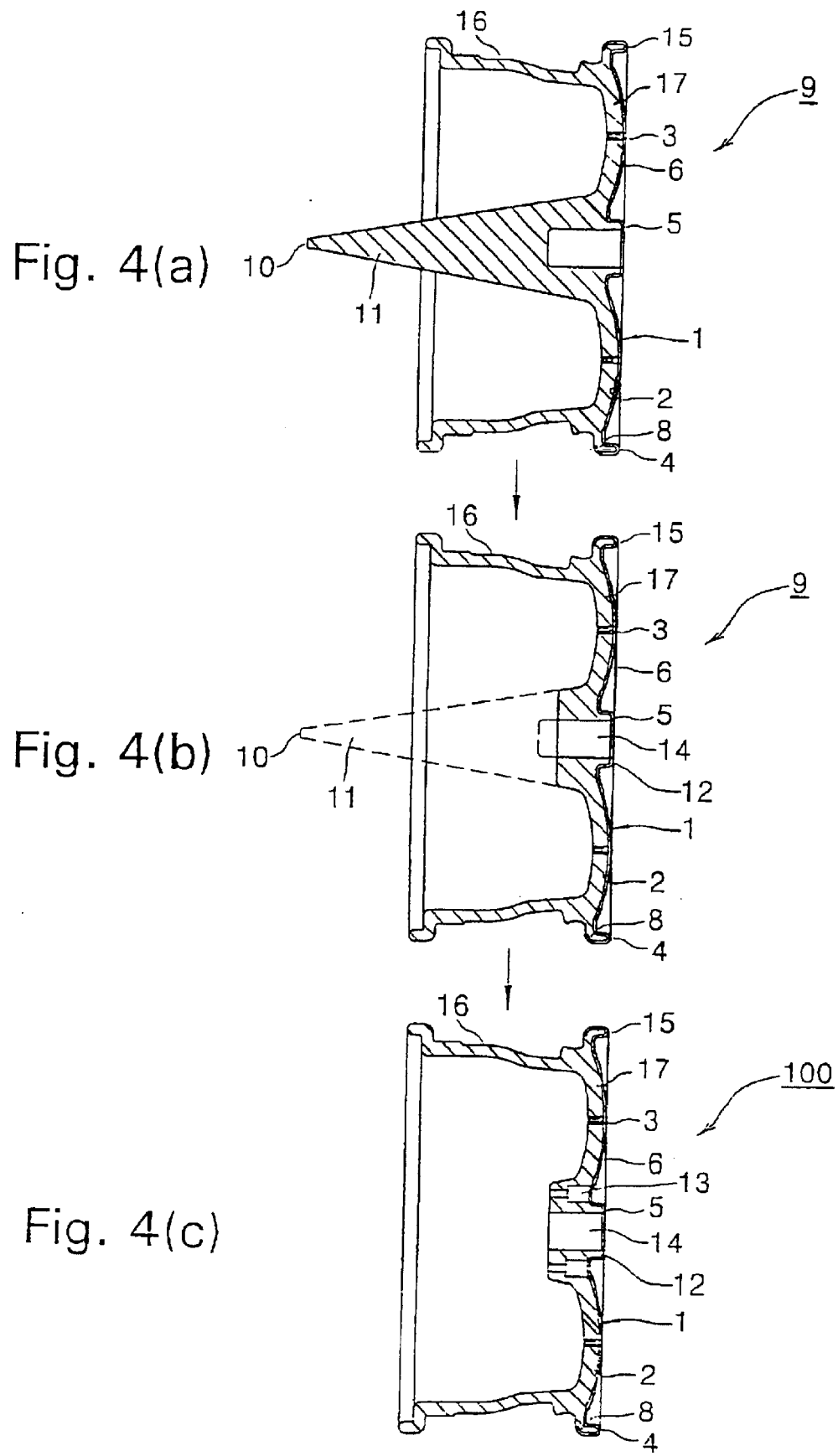
FIGS. 4(a), 4(b) and 4(c) are vertical sections of the wheel which is cast through working processes according to the process for manufacturing the wheel of the present invention.
Figure 5:
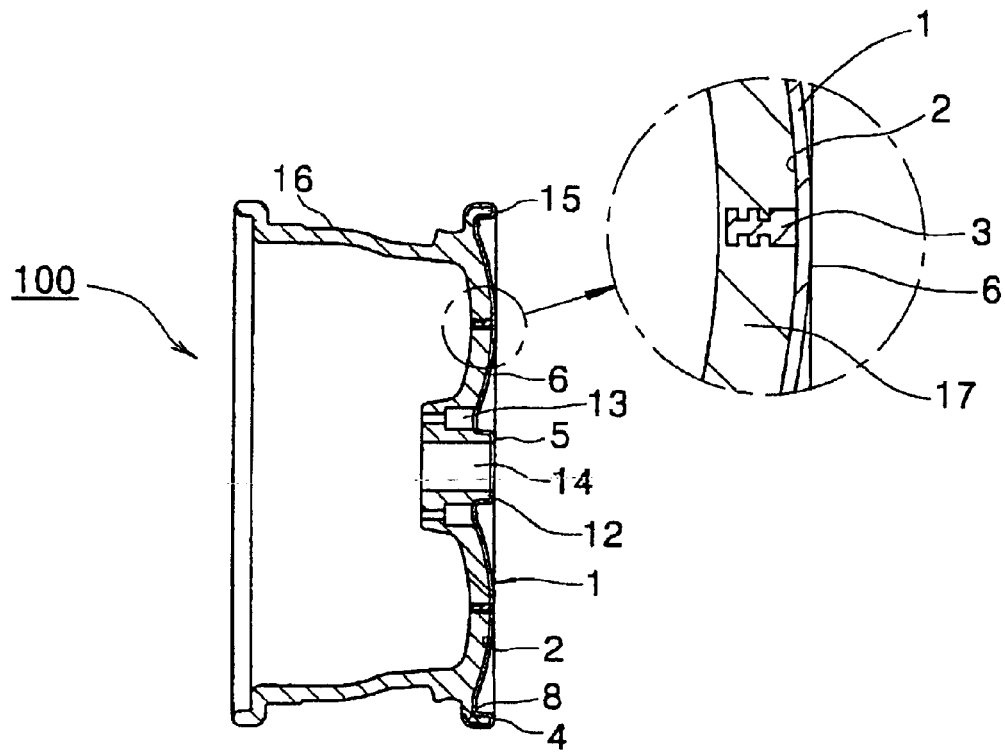
FIG. 5 is a vertical section of the wheel made by the process of the present invention.

FIGS. 4(a), 4(b) and 4(c) show vertical sections of the wheel 100 cast from the stainless steel insert 1 using the working procedures according to the process for manufacturing the wheel of the present invention.

FIG. 4(a) shows a wheel mold 9 cast by a die casting process, and when the wheel mold 9 is removed from the molding device 60, a projection 11 is formed on the lower part of the leading portion 10 to be cut off. The projection 11 needs to be severed by a cut working after casting.

The wheel mold 9 in FIG. 4(a) is set on the width part of the hub 12 as shown in FIG. 4(b) and the projection 11 formed on the lower part of the leading part 10 is removed by cut working. The hub nut holes 13 are then formed on the hub 12 by mechanical working, as shown in FIG. 4(c), and the transformation from a wheel mold 9 to the wheel 100 is complete. At this time, a hub axle hole 14 formed on the central part of the wheel 100 is not molded by casting.

After cut working of the projection 11 on the lower part of the leading part 10, the hub axle hole 14 may be worked by mechanical working, together with the stainless steel insert 1.

Accordingly, as shown in FIGS. 5 to 8, the wheel 100 for the automobile of the present invention comprises a rim 15 and a rim base 16 which supports a tire, and a hub 12 which is formed as a thick projection for supporting the wheel 100 on the hub axle.

The hub 12 is formed with a plurality of hub nut holes 13 in order to secure the wheel 100 on the hub axle and a hub axle hole 14 which receives the hub axle. A plurality of spokes or rim supports 17 are radially formed between the hub 12 and a rim base 16. A number of holes 18 are formed to reduce wheel weight between the spokes 17 and to facilitate or promote cooling by dispersion of heat produced by the brake drum (not shown).

When the wheel 100 is positioned on the hub axle, faces on the hub 12, the rim 15, the rim supports 17 and holes 18 provide a pleasing external appearance and are integrally joined. The rim 15 is wrapped at the outside edge thereof as the stainless steel insert 1 is worked by the press process. The fixedly welded or secured supporting protrusions 3 on the joined face 2 of the stainless steel insert 1 are embedded in the melted aluminum alloys to form a part of the spokes 17.

Figure 9:
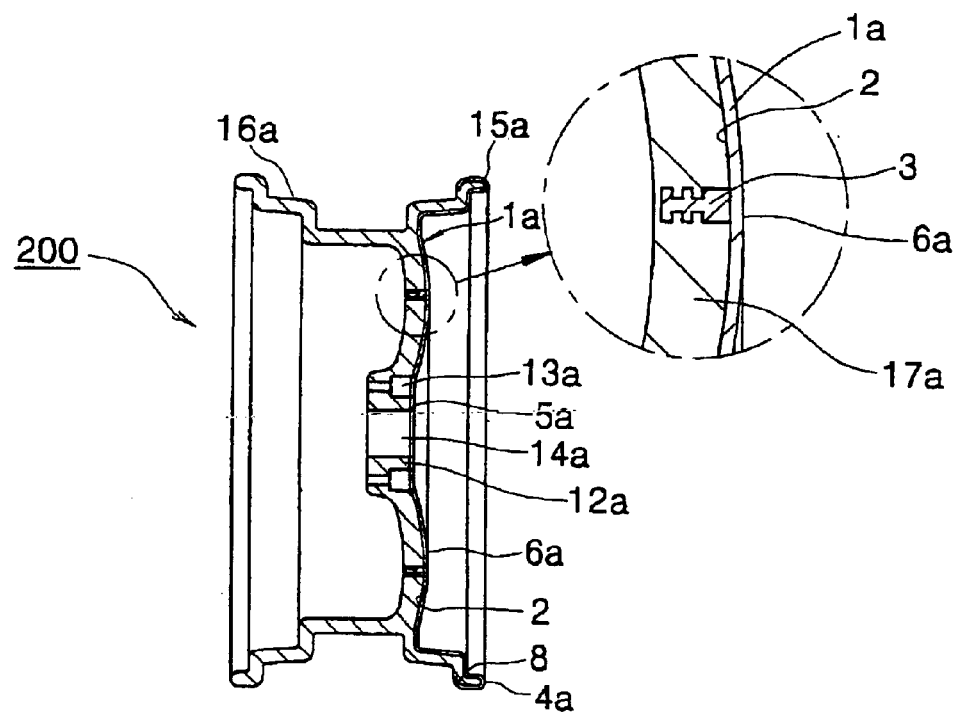
FIG. 9 is a vertical section of a wheel which is made by another embodiment of the present invention.
Figure 10:
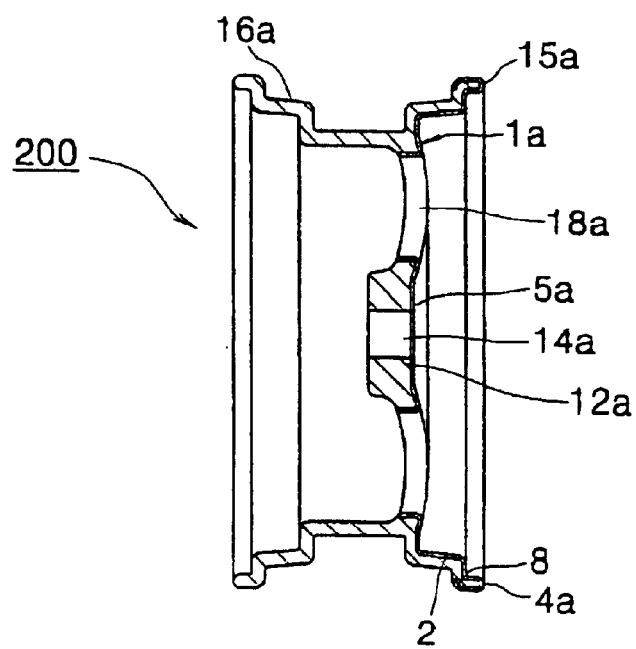
FIG. 10 is a vertical section which shows a hole area formed between rim supports in FIG. 9.

FIG. 9 shows a vertical section of a wheel 200 according to another embodiment of the present invention, and FIG. 10 shows a vertical section of a hole portion formed between spokes or rim supports 17a.

FIGS. 9 and 10 provide constitutions of the wheel 200 formed with another shape. The wheel 200 is formed with another shape that moves the positions of: a hub 12a which is formed with hub nut holes 13a and a hub axle hole 14a in the wheel 200; spokes 17a formed extending radially from the hub 12a to a rim base 16a; and holes 18a formed between the spokes 17a. A tire is placed onto a central portion position of the rim base 16a.

Also a stainless steel insert 1a is formed in such a way that a tire (not shown) is positioned on the wheel 200. The wheel is placed on the hub axle (not shown). The stainless steel insert 1a is worked. The rim face 4a, the hub face 5a, rim support faces 6a, and the hole face 7a, are parts providing the external appearance of the wheel 200. The wheel created by the press process can be modified to have different shapes, faces and holes. The insert is then integrally molded with Al alloys.

After integral formation of the stainless steel insert 1a (one side face of the wheel 200), the same die casting process, cut working and mechanical working are carried out as in the first embodiment and the wheel 200 is manufactured. The operational effects are the same as in the embodiment of FIGS. 1 to 6.

According to the present invention, various effects are obtained as follows. The face of the wheel has improved smoothness, and brightness without any plating treatments because the stainless steel insert has properties of high gloss, corrosion resistance and heat resistance. The stainless steel insert is integrally molded with aluminum alloys on the face of the wheel. The insert provides substantially the entire external appearance when the wheel is positioned on the hub axle. The external appearance of the wheel is made beautiful and easy to wash by the stainless steel material. Separate plating for the wheel is not required.

Further, the joining faces of the stainless steel insert are roughly treated by sanding or brushing, and a number of protrusions having undercuts are fixedly welded or secured to the joining faces of the stainless steel insert in positions corresponding to the rim supports of the wheel. The protrusions are embedded in Al alloys, and adhesion between the cooled Al material and the stainless steel insert is much improved and detachment of the stainless steel insert may be prevented. The bending part of the rim also receives melted Al alloys and due to its shape can secure the rim of the insert to the hardened Al alloys. For the wheels made of Al alloys, the stainless steel inserts provide an outer viewable layer having high quality, and mass production is possible. Production of inferior wheels can be prevented.

What is claimed is:

1. A process for making an automobile spider wheel of aluminum alloys with a face layer of stainless steel material comprising:

providing a stainless steel insert which is worked by a press process based on side face shapes for an external appearance of an automobile wheel, the insert having an external side and a joining surface on an interior side;

treating roughly the joining surface of the stainless steel insert;

weldably fixing a number of outwardly projecting protrusions on the joining surface of the stainless steel insert in positions corresponding to spoke faces of the wheel;

inserting the insert onto a bottom of a lower mold of a molding device with the protrusions directed upwardly; and molding integrally the insert at the joining surface to a melted composition containing one or more aluminum alloys by a die casting process after assembling left and right molds and an upper mold to close the molding device about the stainless steel insert, the die casting process embedding the protrusions in the aluminum alloys.

2. An automobile spider wheel comprising an aluminum alloy including a rim base for supporting a tire and comprising a stainless steel insert, the insert comprising a hub formed with a number of hub nut holes and a hub axle hole, a rim, a number of spokes formed radially between and joining the hub and the rim, and openings formed between the spokes to provide the automobile spider wheel with a face layer of the stainless steel insert covering the wheel and the rim of the stainless steel insert wrapping about an edge of the rim base, the spider wheel comprising protrusions secured to and protecting from the stainless steel insert and embedded in the aluminum alloy, wherein faces of the spokes and the holes are arranged so that only the face layer of the stainless steel insert is viewable when the wheel supports a tire and is installed onto a hub axle.

3. The spider wheel according to claim 2, wherein the wheel is free from adhesives.

4. A process for making an automobile spider wheel comprising at least one aluminum alloy and a face layer of stainless steel material, the process comprising the steps of:

working a stainless steel insert so that the stainless steel insert includes side face shapes corresponding to an external appearance of an automobile spider wheel, the stainless steel insert having an external face on an exterior side thereof and a joining face on an interior side thereof;

treating the joining face of the stainless steel insert to have a rough surface;

fixing protrusions onto the joining face of the stainless steel insert;

inserting the stainless steel insert into a mold of a molding device;

closing the mold; and molding the stainless steel insert at the joining face to a melted composition comprising one or more aluminum alloys to form an automobile spider wheel with the face layer formed by the stainless steel insert covering the entirety of the external appearance of the automobile spider wheel including an outer rim of the spider wheel.

5. The process according to claim 4, wherein the step of inserting the stainless steel insert into the mold of the molding device comprises inserting the stainless steel insert with the protrusions projecting toward a center of the mold.

6. The process according to claim 5, wherein the step of inserting the stainless steel insert into the mold with the protrusions projecting toward a center of the mold comprises inserting the stainless steel insert onto a bottom of a lower mold of the molding device with the protrusions directed upwardly.

7. The process according to claim 6, wherein the step of closing the mold comprises assembling left and right molds and an upper mold of the molding device to close the mold about the stainless steel insert.

8. The process according to claim 7, wherein the step of molding the stainless steel insert at the joining face to the melted composition so that the protrusions are embedded, comprises utilizing a die casting process to embed the protrusions in the one or more aluminum alloys.

9. The process according to claim 4, wherein the step of molding the stainless steel insert at the joining face to the melted composition embeds the protrusions in the one or more aluminum alloys.

10. The process according to claim 4, wherein the step of fixing a number of outwardly projecting protrusions on the joining surface of the stainless steel insert comprises weldably fixing the protrusions.

11. The process according to claim 4, including the step of, after molding the stainless steel insert to the aluminum alloys, forming hub nut holes by mechanical working.

12. The process according to claim 4, wherein the step of treating the joining face of the stainless steel insert to have a rough surface comprises brushing or sanding the joining face.

13. The process according to claim 4, wherein the step of molding the stainless steel insert at the joining face to the melted composition comprises utilizing a die casting process.

* * * * *